July 1, 1969 — J. G. WRIGHT — 3,453,619
SEA MOTION CORRECTOR
Filed Oct. 14, 1968

INVENTOR
JERAULD G. WRIGHT
BY
ATTORNEYS

United States Patent Office 3,453,619
Patented July 1, 1969

3,453,619
SEA MOTION CORRECTOR
Jerauld George Wright, Ottawa, Ontario, Canada, assignor to Her Majesty the Queen in right of Canada, as represented by the Minister of National Defence
Filed Oct. 14, 1968, Ser. No. 767,428
Claims priority, application Canada, Oct. 23, 1967, 3,203
Int. Cl. G01s *9/44;* G06g *7/22;* G06f *15/20*
U.S. Cl. 343—8                                   7 Claims

ABSTRACT OF THE DISCLOSURE

A device for providing correcting signals for correcting errors in a Doppler radar readout of aircraft track angle and aircraft ground speed which errors are caused by the surface motion of the sea. The device takes advantage of small angle approximation made possible by the fact that the correction to the readout will rarely exceed two degrees in angle and eight knots in length.

Background of the invention

This invention relates to a device for providing correcting signals for correcting errors in a Doppler radar readout of aircraft track angle and aircraft ground speed.

In Doppler radar sets, an error is introduced when flying over the sea due to the surface motion of the sea. This movement is not caused by the motion of the waves, which carries no appreciable water movement with it, but by movement of a small skin of water on the surface which moves at a speed varying from zero to a maximum of about 10 knots, usually in the direction of the surface wind. The value of the correction to Doppler data made necessary by this motion has been found experimentally, and it has been known for about the last ten years that by looking at the surface of the sea a navigator can usually estimate the required correction vector to within one or two knots. It is worthwhile, therefore, to introduce a correction to the Doppler output to compensate for the effect of this sea motion. This is the purpose of the present invention.

It has been proposed to arrange for the sea motion vector to be added to the Doppler vector by normal vector addition processes, either analog or digital, and obtain as the vector sum the corrected ground speed and the corrected track angle of the aircraft. To make a solution of this sort, however, requires a complete vector analysis of the vector triangle so set up. Furthermore, since the Doppler equipment provides answers to the order of one knot, and since a navigator can estimate the correction vector to the order of one knot, it is important that the vector sum should be obtained to the same degree of accuracy. This requires that the vector triangle be solved to a high degree of precision. Again, since the correction analog triangle is, in accordance with such a proposal, in series with the Doppler data, further complicated switching arrangements need to be provided so that the analog triangle can be switched out of the stream of navigational computation when the aircraft is over land, otherwise an unnecessary series error is propagated into the very precise overland readings.

It is an object of this invention to simplify the computation of the necessary corrections, using relatively low-precision components.

I have observed that the correction for sea motion never exceeds 10 knots in vector length; thus, the angular correction to the Doppler readout will rarely exceed two degrees. I therefore have concluded that it is possible to take advantage of small angle approximations, and furthermore to replace the solution of the entire navigational triangle by solution of a much smaller incremental triangle. By using the smaller incremental triangle a leverage effect is gained as far as precision is concerned, because even if the incremental triangle is solved only to an accuracy of 10%, since its effect on the overall navigational triangle is small, the incremental correction as a percentage of the whole navigational triangle solution can still be within a fraction of 1%.

Summary of the invention

According to the present invention there is provided a device for providing correcting signals for correcting errors in a Doppler radar readout of aircraft track angle and aircraft ground speed comprising means for applying as a first input to the differential means a signal of track angles; means for applying as a second input to the differential means a signal of surface wind direction; a resolving means; means for applying as a first input to the resolving means a differential output signal from the differential means; means for applying as a second input to the resolving means a signal proportional to surface wind speed; whereby to obtain as a first output from the resolving means a cosine resolution being a signal proportional to the required ground speed direction; and as a second output a sine resolution; and dividing means for dividing the sine resolution output by a signal proportional to the aircraft speed whereby to obtain from the dividing means the signal proportional to the required track correction.

According to a preferred embodiment the means for the second input to the differential means is manually operator-controlled and in which the means for applying the second input to the resolving means is manually operator-controlled.

Brief description of the drawings

The following is a description by way of example of one embodiment of the present invention as it applies to analog computation, reference being had to the accompanying drawings in which.

Description of the preferred embodiment

Figure 1:
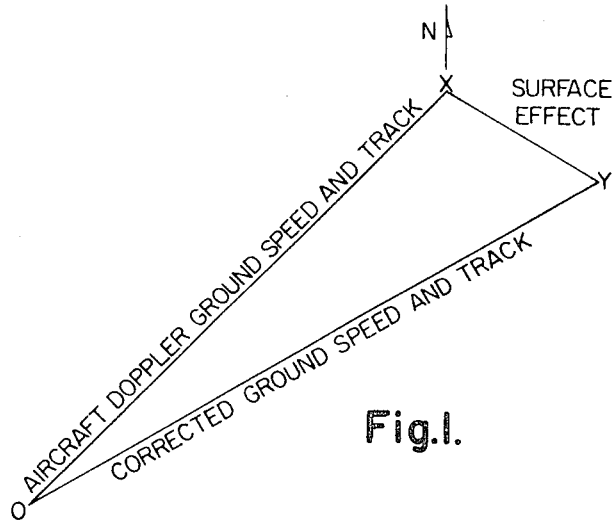
FIGURE 1 is a triangle showing the problem to be solved.
Figure 2:
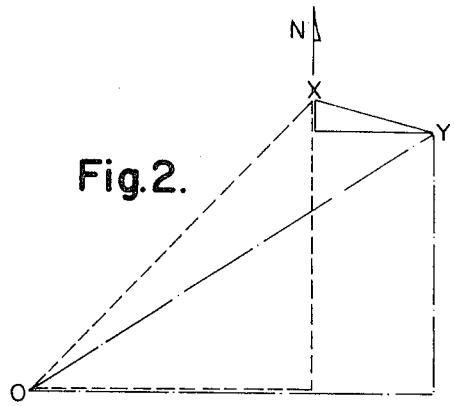
FIGURE 2 is a conventional solution.
Figure 3:
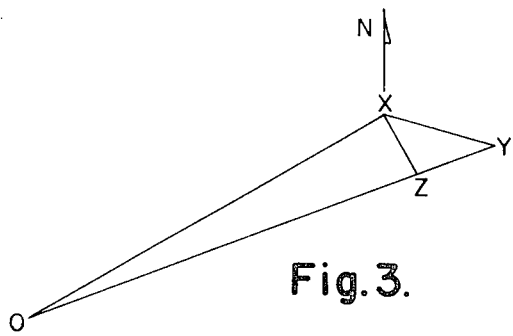
FIGURE 3 is a geometrical representation, not to scale, of a navigational triangle using my approximations.

Referring to the drawings, an examination of FIGURE 1 suggests a conventional solution as at FIGURE 2 by resolving each of the three sides of the triangle into cartesian co-ordinates to a common frame of reference, balancing the necessary equation and then finally converting the answer from cartesian co-ordinates back to polar co-ordinates to obtain the corrected ground speed and corrected track angle. According to my invention, it is necessary only to resolve one side of the triangle, namely, the sea motion vector, and no conversion in the normal sense of the word is required to convert the answer from cartesian to polar co-ordinates, as my output analogues are made to appear in that form.

In setting up the triangle for solution let the Doppler ground speed side of the triangle be OX, the sea motion side of the triangle be XY, and then corrected ground speed side of the triangle be YO. The solution is then achieved as follows:

Since the angle XOY is in practice less than two degrees, an arc to radius OX projected on OY at Z can be considered to be a straight line, and to be at right angles both to OX and to OZ. On this basis an incremental triangle XZY can be established, and this is the triangle used as the basis of this present solution. It will be seen that, if XZ can be obtained, it can be used to define the angle XOZ in radian measure, and can be converted to a linear and scalar angular measure, under these circumstances, simply by dividing it by its radius OX or OZ. Similarly, since OX and OZ are equal by definition, the corrected ground speed can be obtained by adding the side ZY of the incremental triangle to either OX or OZ. In this case to a first order ZY can be regarded as the correction which, if added to OX, produces the desired corrected ground speed. Furthermore, it can be seen that in converting XZ from arc to angle by dividing by OX or OZ, in view of the small angle and the normally great difference between sea motion correction and aircraft speed, the angular correction will be obtained to a fraction of a degree, and therefore in terms of overall navigational triangle, to a fraction of a percent, even if a very crude approximation of the length OZ is inserted for purposes of the conversion from arc to angle. This allows me to use the corrected ground speed length OY as the dividing factor, and in fact to insert the length OY only in incremental and discrete steps of twenty knots. For most purposes it would be sufficient to set this length at the cruising speed of the aircraft, but for tactical airplanes, which may have very wide variations in operating speed, it is desirable to have several speed settings within this range at intervals of about twenty knots. By this means it is acceptable to have these speeds set in at intervals by the operator.

Figure 4:
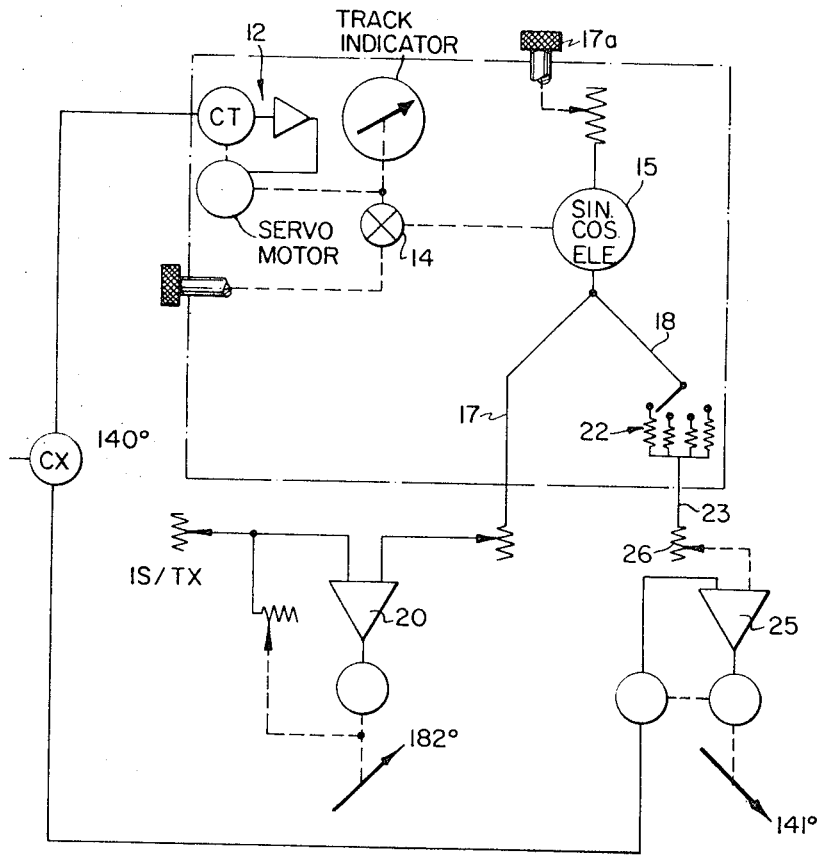
FIGURE 4 is a schematic diagram.

As has been said hereinbefore, a satisfactory solution can be obtained by determining XZ and ZY, and those themselves now do not need to be determined to any very high degree of accuracy, but permit, nevertheless, a practically acceptable solution of the overall angle XOY. By the definitions given above X, Z, Y can be taken to be a right angle triangle, and XZ and ZY can therefore be obtained by a resolution of this triangle using either the angle ZXY or its complementary angle XYZ. Since the vector OX is developed along with Doppler indicated track of the aircraft, and since XY is developed along the general direction of the surface motion of the sea, which value can be set manually into the instruments by the operator, it can been that by simple summation, the angle OXY can be obtained, or its supplement. As the angles at X and Z can both be taken, for the purposes of the present order of approximation to be right angles, this differencing will also yield the angle XYZ. The apparatus of the invention which effects the present solution is seen in FIGURE 4.

An electrical analog input of Doppler track angle is followed up in a conventional servo loop 12 when it is converted to a shaft rotation and is indicated on a dial 13 for the convenience of the operator and to enable him to ascertain that the servo loop is functioning properly. This track angle is applied as a first analog input to a differential means 14, in this case a mechanical differential. A second input to the differential 14 is an analog signal of the angle of observed surface wind and is applied as a shaft rotation by the operator. The sum of these two angles, which may be taken to be XYZ, is then used as a first input to set the angular input of a suitable resolving element 15, in this case a resolving potentiometer (it could suitably also be a synchro resolver). The second, or, length input into the resolver 15 is in the form of an electrical analog signal applied through knob 17a by the operator and being proportionate to the speed of the surface motion, that is to say, the sea motion vector length.

The cosine and sine resolutions from the resolver 15 then, correspond to the vectors ZY and XZ and appear as electrical analog on lines 17 and 18.

As shown above, direct summation of ZY, required ground speed correction to OX, Doppler ground speed vector, can provide the necessary corrected ground speed to the order of a fraction of a percent even if the resolver 15 itself is accurate only to a few percent. This correction increment ZY signal is therefore passed directly on line 17 as an output of the apparatus. In the preferred method of use it is summed directly with the Doppler ground speed by adding it as a small bias to a standard servo amplifier 20 which follows that ground speed. Since the correction is very small, and since even a large error in the correction is only a small error in the final answer, this bias can be considered to be linear when used as an input to most servo amplifiers and special summing apparatus is not required. Suitable scaling can be achieved by adjusting proportionately the strength of the voltage passed to the ground speed servo loop.

The value equivalent to XZ obtained requires only to be divided by the length approximating to OX, OZ or OY to yield a signal proportional to the required heading angle correction. I prefer to use an approximation of the length OY, this speed is observed and set in by the operator by selecting one of the several fixed potentiometers 22 (or, alternatively a sliding potentiometer could be used), which are arranged to represent speed increments of twenty knots approximately. Division is obtained by simply passing the value corresponding to XZ in a suitable fashion directly through the selected resistance. This output, then, when suitably scaled as to voltage, corresponds directly to the desired heading correction and is passed from the apparatus in this form on line 23. In the preferred embodiment I avoid the use of a servo follow-up apparatus to return the angle into a mechanical value by arranging that the analog signal on line 23 is fed directly into the servo loop 25 which repeats the track angle or drift angle from the Doppler apparatus. Since the angle is small, and since the error voltage involved in an angular servo loop of this sort is normally linear close to the null, this correction can be suitably scaled in a proportionate fashion by a simple trimming resistor 26 and can then be applied as a bias directly to the servo loop without special summing means, and a suitably accurate presentation of corrected track angle or drift angle will thereby be achieved.

In another embodiment of my apparatus, advantage can be taken of the fact that a highly precise input of track angle is not required. The track servo loop 12 could thus be eliminated, and track angle input could be inserted by a simple self-synchronous repeater, which would feed directly into the differential.

What I claim as my invention is:

1. A device for providing correcting signals for correcting errors in a Doppler radar read-out of aircraft track angle and aircraft ground speed comprising a differential means; means for applying as a first input to the differential means a signal of track angles; means for applying as a second input to the differential means a signal of surface wind direction; a resolving means; means for applying as a first input to the resolving means a differential output signal from the differential means; means for applying as a second input to the resolving means a signal proportional to surface wind speed; whereby to obtain as a first output from the resolving means a cosine resolution being a signal proportional to the required ground speed direction; and as a second output a sine resolution; and dividing means for dividing the sine resolution output by a signal proportional to the aircraft speed whereby to obtain from the dividing means the signal proportional to the required track correction.

2. A device for providing correcting signals for correcting errors in the Doppler radar read-out of aircraft track angle and aircraft ground speed, comprising a differential means; means for applying as a first input to the differential means an analog signal of track angle; means for applying as a second input to the differential means an analog signal of surface wind direction; an analog resolving means; means for applying as a first input to the resolving means the differential output analog signal from the differential means; means for applying as a second input to the resolving means an analog signal proportional to the surface wind speed; whereby to obtain as a first output from the resolving means a cosine resolution being an analog signal proportional to the required ground speed correction; and as a second output a sine resolution; an analog dividing means for dividing the sine resolution output by a signal approximating the aircraft speed whereby to obtain from the dividing means an analog signal proportional to the required track direction.

3. A device as claimed in claim 2 in which the means for applying the second input to the differential means is manually operator-controlled and in which the means for applying the second input to the resolving means is manually operator-controlled.

4. A device providing correcting signals for correcting errors in a Doppler radar read-out of aircraft track angle and aircraft ground speed, comprising a mechanical differential; means for applying as a first input to the mechanical differential a signal of track angle in the form of a shaft rotation; operator-controlled means for applying as a second input to the differential an analog signal of surface wind direction in the form of a shaft rotation; an electrical resolver; mechanical connections between the differential and the resolver for positioning the resolver by the output from the differential; operator-operated means for controlling the excitation of the resolver proportionally to an analog of surface wind speed; whereby to obtain a cosine resolution output signal from the resolver being an electrical analog proportional to the required ground speed correction; a potentiometer dividing means for providing a plurality of divisor analog signals corresponding to a plurality of ground speeds; an electrical connection between the resolver and the potentiometer dividing means for applying thereto a sine output resolution electrical analog signal from the resolver whereby to obtain from the dividing potentiometer means a signal proportional to the required track correction.

5. A device according to claim 4 in which the electrical resolver is a sine-cosine potentiometer.

6. A device according to claim 4 in which the electrical resolver is a synchro resolver.

7. A device as claimed in claim 4 in which the analog proportionate to ground speed correction and the signal proportional to the required track correction are each applied as a bias signal to an amplifier of a related servo loop.

References Cited

UNITED STATES PATENTS

| | | | |
|---|---|---|---|
| 2,848,160 | 8/1958 | Biderman | 235—190 |
| 3,044,059 | 7/1962 | Belchis | 343—8 |
| 3,072,900 | 1/1963 | Beck | 343—8 |
| 3,077,594 | 2/1963 | McKay et al. | 343—8 |
| 3,090,958 | 5/1963 | Brown | 235—190 X |

RICHARD A. FARLEY, *Primary Examiner.*

CHARLES L. WHITHAM, *Assistant Examiner.*

U.S. Cl. X.R.

235—151.32, 186